July 27, 1948.    A. G. OBLAD ET AL    2,446,100
PREPARATION OF CATALYSTS
Filed July 12, 1945
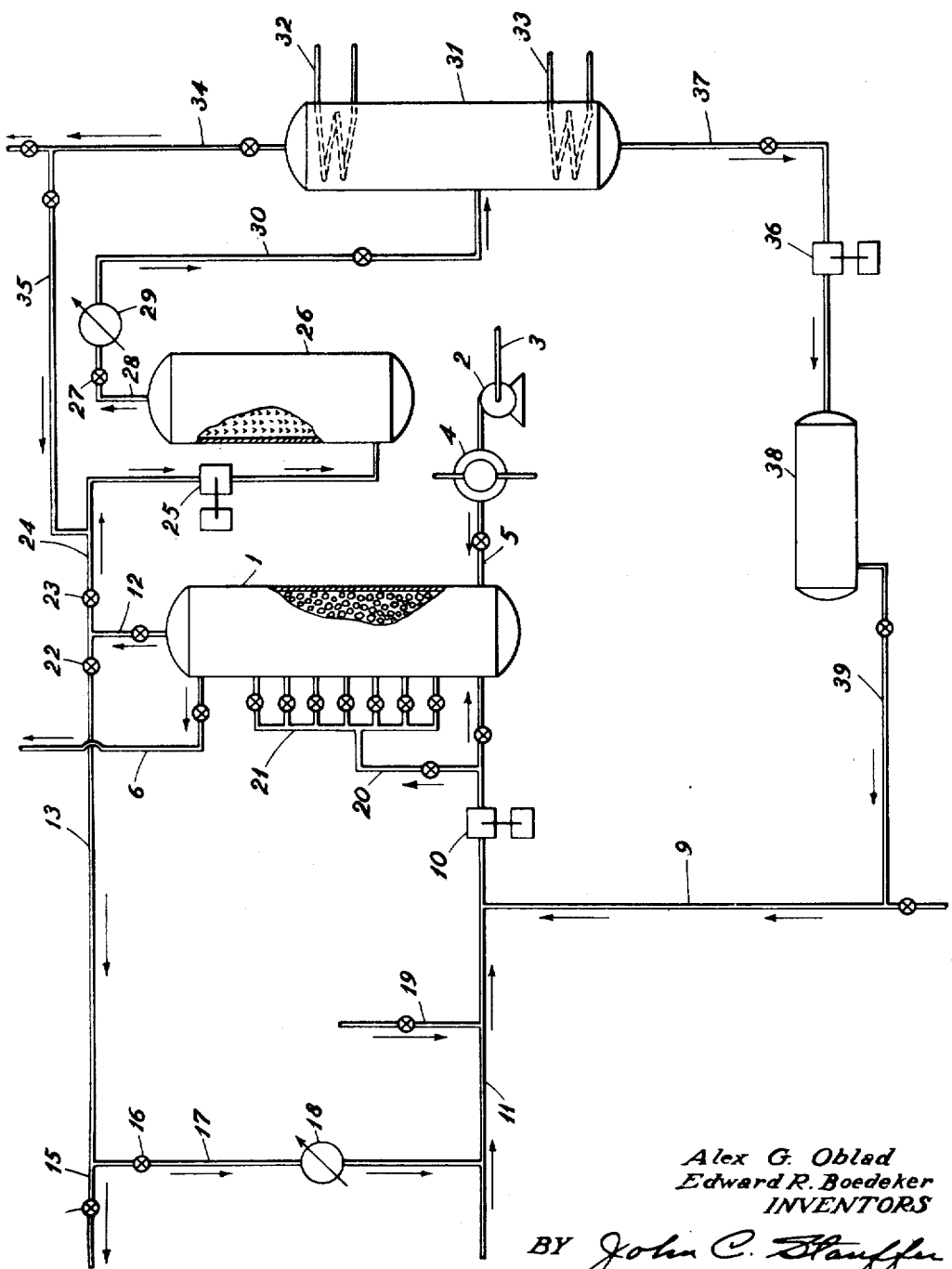
Alex G. Oblad
Edward R. Boedeker
INVENTORS
BY John C. Stauffer
ATTORNEY Patented July 27, 1948

2,446,100

UNITED STATES PATENT OFFICE 2,446,100

PREPARATION OF CATALYSTS

Alex G. Oblad and Edward R. Boedeker, Dallas, Tex., assignors, by mesne assignments, to Socony-Vacuum Oil Company, Incorporated, New York, N. Y., a corporation of New York Application July 12, 1945, Serial No. 604,714

4 Claims. (Cl. 252—251)

1

This invention relates to improved catalysts and the preparation thereof. More particularly, this invention relates to an improved method for preparing supported aluminum chloride catalyst for use in such hydrocarbon conversion processes as alkylation, isomerization, polymerization, cracking and the like. Specifically, this invention relates to an improved method of impregnating highly porous catalyst supports such as alumina gel or silica gel with aluminum chloride in a manner such that the catalytic efficiency of said supports and of the supported aluminum chloride is not reduced by non-uniform coating of said supports with the aluminum chloride.

Supported aluminum chloride is widely used as a catalyst in catalytic conversion processes particularly in the refining and conversion of petroleum hydrocarbons. Various methods have been proposed for preparing and regenerating the supported catalyst. Thus, it has been proposed to mechanically mix the aluminum chloride and the support and then to pill the mixture or the mixture may be heated and subjected to pressure to obtain more intimate contact of the support with the catalyst. Another method suggested is to volatilize the aluminum chloride and adsorb the vapors on the support. Another method which has been proposed is to dissolve aluminum chloride in the liquid hydrocarbon feed to the process from which solution the aluminum chloride is removed and adsorbed by the porous support. While this procedure is an excellent method for depositing the more soluble aluminum bromide on the porous support, the limited solubility of aluminum chloride in hydrocarbons and hydrocarbon mixtures makes the method less adaptable for efficiently preparing a supported aluminum chloride catalyst containing relatively large amounts of aluminum chloride.

An object of our invention is to prepare a uniformly impregnated porous solid material with aluminum chloride. Another object of our invention is to regenerate a partially spent supported aluminum chloride catalytically active material for use in such hydrocarbon conversion processes as isomerization, alkylation and cracking. A further object of our invention is to prepare a highly active form of porous solid-supported aluminum chloride catalyst the penetration of the pores of said support having aluminum chloride distributed uniformly therethrough. A still further object of the invention is to provide a method for applying to a porous

2 solid carrier a uniformly distributed Friedel-Crafts type catalyst comprising aluminum chloride with or without controlled amounts of intimately associated aluminum bromide in said catalyst. An additional object of our invention is to provide an improved method and means for combining our porous solid or gel type supported Friedel-Crafts type catalyst with promoters for such hydrocarbon conversion processes as isomerization and alkylation. These and other objects will be apparent as the detailed description of our invention proceeds.

In the preferred embodiment of our invention we first impregnate the moisture-free porous solid or gel type support with aluminum bromide by contacting said support with a solution of aluminum bromide in a suitable solvent such as normal butane, normal pentane or normal hexane or mixtures of these at a temperature preferably below 150° F. and at pressures sufficient to maintain the solution in liquid phase. We prefer to use normal butane as the solvent and to carry out the aluminum bromide adsorption at temperatures within the range of from 50° F. to about 150° F. Thus, at 100° F. the solubility of aluminum bromide is about 40 parts by weight of aluminum bromide per 100 parts by weight of solution in the above solvents. On the other hand the solubility of aluminum chloride in these solvents at 100° F. is less that 0.002 part per 100 parts of solution and even at 200° F. the solubility of aluminum chloride is less than one part per 100 parts of solution while aluminum bromide is miscible with these solvents in all proportions at 200° F. Hence, we utilize the more soluble aluminum bromide in the solution contacting step of our process. When the desired amount of aluminum bromide has been adsorbed by the support as determined by direct analysis of the impregnated support or indirectly by analysis of the aluminum bromide depleted solution, the solvent is removed and the impregnated support is contacted with free chlorine and/or hydrogen chloride either in the gas phase or preferably by a hydrocarbon solution of chlorine or hydrogen chloride the aluminum bromide impregnated carrier being converted in situ to aluminum chloride impregnated carrier. This chlorine substitution step of our process is preferably carried out at relatively low temperatures within the range of from about 50° F. to about 75° F. in order to minimize the reaction of the dissolved chlorine with the hydrocarbon. Free displaced bromine passes into the hydrocarbon solvent. A small amount of hydrogen bromide is also formed and these two products, both of which are activators for the aluminum bromide catalyst, are also adsorbed to some extent on the carrier support, thus furnishing activators in situ for the supported catalyst. In some cases the bromine substitution step may be carried out at higher temperatures in order to produce higher concentrations of halogen acids and alkyl halides in the hydrocarbon solvent. The chlorides may serve to substitute chlorine for bromine in the substitution step and the corresponding bromides will react with metallic aluminum in the succeeding step, described hereinbelow, to produce recycle aluminum bromide for the initial impregnation step.

The hydrocarbon solvent from the above described chlorine substitution step of our process which contains dissolved free bromine and which may or may not contain appreciable amounts of hydrogen bromide and alkyl bromide is contacted in a third reaction with activated metallic aluminum for the regeneration of aluminum bromide. This step of the process is carried out at temperatures within the range of about 80° F. to about 250° F. as described in copending Serial No. 581,164 entitled Manufacture of aluminum bromide filed March 5, 1945 (now U. S. Patent No. 2,439,737, issued April 13, 1944).

The accompanying drawing illustrates the process steps of the invention in the form of a flow diagram. The catalyst impregnation tower is illustrated as a continuous bed of porous solid packing but it is to be understood that other types of distribution of catalyst support in the reactor such as catalyst supported on separate trays is within the scope of our invention. Other auxiliary equipment such as heat exchangers, coolers, heaters, blowers, etc., the necessity for which will be readily recognized by those skilled in the art, have been omitted for the sake of simplicity.

Referring to the flow diagram catalyst support such as activated alumina gel, silica gel, acid treated bauxite, or acid treated clay, such as acid treated bentonite, is heated in tower 1 to remove adsorbed water in a pretreatment step before impregnating the support with aluminum bromide. Tower 1 consists of a reactor which may or may not be equipped with internal heating or cooling coils for the control of temperature of the specific reaction wherein the supported catalyst is used. If tower 1 is so equipped, a heating fluid such as flue gas may be passed through the coils to produce the heat for drying the support. Flue gas is passed by means of blower 2 in line 3 through heat exchanger 4 where the gas is conditioned to a temperature within the range of from 400° F. to 750° F. The gas passes through line 5 to tower 1 and heat is transferred either indirectly through the coil walls or directly to the support by contact with the same. The flue gas passes from tower 1 through valved line 6. When the support is substantially free of water, the temperature of the flue gas in line 5 is lowered to approximately atmospheric temperature and the flow of gas is continued to lower the temperature of the support to about 80° F. or 90° F. in preparation for the aluminum bromide impregnation step.

Normal butane from line 9 containing dissolved aluminum bromide to the extent of from about 10 to about 30 weight per cent is introduced to the support in tower 1 by means of pump 10 in line 11. The temperature of the solution as it enters tower 1 is within the range of from 60° F. to about 100° F. and tower 1 is maintained at a pressure within the range of from atmospheric to 100 pounds per square inch gauge during the impregnation step. As the solution passes upward through the tower aluminum bromide is extracted from the solution and adsorbed on the porous support and the solution, partially depleted with respect to aluminum bromide passes from tower 1 via valved line 12 to line 13. We may carry out the impregnation of the support by continuous circulation of the hydrocarbon by closing valve 14 in line 15 and opening valve 16 in line 17 which connects with line 11. When operating in this manner, the recycle butane stream, cooled by cooler 18 in line 17, is enriched with aluminum bromide introduced to line 11 via valved line 9. The use of a continuously circulating stream of butane solution of aluminum bromide is particularly adaptable when it is desired to impregnate the support with relatively large amounts of aluminum chloride. If, on the other hand, only thin films of aluminum chloride are desired on the support, the desired amount of aluminum bromide may be dissolved in the butane and the solution is then retained in tower 1 in contact with the support until the aluminum bromide is adsorbed on the support after which the aluminum bromide depleted solvent is removed from the system via line 15 or the butane, substantially depleted of aluminum bromide, may be passed through line 17 to line 11 for use in the next step of the process as described hereinbelow.

The aluminum bromide impregnation step of our process is followed by the conversion of the adsorbed aluminum bromide to aluminum chloride. To the stream of normal butane in line 11, which may be fresh solvent or recycled stock from line 17, is added free chlorine through line 19. As the solution of chlorine is passed upward through the aluminum bromide impregnated support in tower 1, the dissolved chlorine reacts with the supported aluminum bromide to form in situ supported aluminum chloride. If desired, the hydrocarbon solution of chlorine may be diverted through line 20 which leads to manifold line 21 thereby introducing the solution to the bed of support in tower 1 at a multiplicity of points in order to obtain more uniform distribution of aluminum chloride throughout the bed of support. During this operation a cooling medium is circulated through internal heat exchange coils (not shown) in order to remove the exothermic heat of the reaction of the chlorine with the aluminum bromide. The reaction is carried out at temperatures preferably below 75° F. in order to minimize reaction of the free chlorine in the feed or free bromide reaction product with the hydrocarbon solvent. The pressure maintained in tower 1 during this step of the process is sufficient to maintain the solution in the liquid phase and will be below 100 pounds per square inch gauge. With valve 22 in line 13 closed and valve 23 in line 24 open the hydrocarbon solvent containing dissolved bromine is passed by means of pump 25 to the bottom of reactor 26 which is packed with aluminum metal preferably in the form of thin sheets or turnings of large surface area. This aluminum metal may be actuated with salts of mercury such as mercuric nitrate.

As the solution of bromine passes upward in contact with the aluminum in reactor 26, the bromine reacts with the aluminum to form aluminum bromide which dissolves in the hydrocarbon solvent. Considerable heat is generated and if desired, this exothermic heat may be removed by permitting a part of the solvent to vaporize thus cooling the reaction mixture or a coolant may be passed through an internal heat exchanger (not shown) in reactor 26. The temperature in reactor 26 should be maintained below about 250° F. and preferably within the range of from about 125° F. to 150° F. The pressure should be sufficient to maintain at least partial liquid phase conditions. Since aluminum bromide is soluble to the extent of about 80 grams per hundred grams of butane solution at 150° F., considerable vaporization in reactor 26 can be tolerated and still retain sufficient liquid solvent to carry the dissolved aluminum bromide to the succeeding separation step described below. If the temperature in reactor 26 is too high, several side reactions may take place. The free bromine will react with a part of the normal butane to form butyl bromide and hydrogen bromide. Isomerization of the normal butane to isobutane will also take place to some extent at temperatures above about 125° F. and the isobutane in turn will be alkylated with the butyl bromide to form octanes and more free hydrogen bromide. Hence, in order to avoid these side reactions it is desirable to operate reactor 26 well below 250° F. and preferably below about 150° F.

The butane solution of the aluminum bromide formed in reactor 26 plus vaporized butane and any hydrogen bromide formed by the reaction of the free bromine with the butane solvent passes overhead through valve 27 in line 28 to condenser 29 where the butane vapor is condensed and the product passes thence by line 30 to fractionator 31 which is equipped with reflux means 32 and heating means 33. Hydrogen bromide is taken overhead from fractionator 31 through valved line 34 for use as activator in an integrated aluminum halide catalysed isomerization process or aluminum halide catalysed alkylation process or it may be recycled via lines 35 and 24 to reactor 26 wherein the bromine content of the hydrogen bromide may be recovered as aluminum bromide. The liquid product of fractionator 31 consisting of butane solvent and dissolved aluminum bromide and a trace of alkyl bromide is passed by means of pump 36 in line 37 to surge drum 38. From surge drum 38 the solution is withdrawn through line 39 which connects with line 9, thus completing the cyclic process.

One method of impregnating porous supports with aluminum halides has several distinct advantages over previous methods known to the art. For example, it is possible by our process to superimpose on and in the porous support successive layers of aluminum chloride and aluminum bromide of any desired depth by adjusting the concentration of aluminum bromide in the impregnating solution and regulating the time of contact of the solution with the support. Thus, a relatively thick layer of aluminum bromide may be impregnated on the support and only partial conversion of this layer to aluminum chloride can then be followed by the deposition of a second layer of aluminum bromide. On the other hand the initially impregnated layer may consist of a relatively thin layer of aluminum bromide which can be completely converted to aluminum chloride and further impregnation with aluminum bromide to produce a supported combination of aluminum-chloride-aluminum bromide catalyst with the aluminum chloride in direct contact with the support. It is well known that a mixture of these two halides of aluminum is more catalytically active for the isomerization of normal butane and for the alkylation of isobutane with olefins than either halide alone. Our catalyst is also more active than other supported aluminum halide catalysts due to adsorption of hydrogen halide and halogen activators in the impregnation step. Due to the use of a solution of aluminum bromide in the hydrocarbon such as normal butane much more uniform and complete impregnation of the support can be made under less severe conditions than are required when using molten aluminum halides as impregnating agents.

Our method of first impregnating the support with aluminum bromide and then converting the bromide to the chloride by treatment of the impregnated bromide with free chlorine may also be applied to the preparation of supported aluminum chloride wherein the initial impregnation is made with molten aluminum bromide which melts at a much lower temperature than aluminum chloride. However, as stated herein above, more uniform and complete contact of aluminum halides is obtainable by use of the hydrocarbon solution of the aluminum bromide as the impregnating agent. Likewise, porous supports may first be impregnated with aluminum bromide vapors and the aluminum bromide impregnated support can then be converted to porous solid supported aluminum chloride by treatment with free chlorine and/or hydrogen chloride vapors.

Our improved method of impregnating catalytically active supports such as alumina gel is of primary importance in fixed bed catalyst systems wherein the impregnation of the support represents a coordinated cycle to which the catalyst in the conversion reactor is subjected. However, supported aluminum chloride or supported mixtures of aluminum chloride and aluminum bromide made by our method may be used in moving bed or fluid flow systems. Our invention is not limited to any particular type of conversion system nor is it limited to the specific flow diagram as hereinabove set forth since numerous modifications and alternative procedural steps and operating conditions will be apparent to those skilled in the art.

We claim:

1. A process for the manufacture of aluminum chloride impregnated porous solid comprising the steps of (1) contacting said solid with a paraffinic hydrocarbon solution of aluminum bromide for a sufficient time to adsorb aluminum bromide on said solid, (2) contacting the aluminum bromide adsorbed on the solid in step 1 with a paraffinic hydrocarbon solution of sufficient chlorine for sufficient time to convert all of said adsorbed aluminum bromide to adsorbed aluminum chloride whereby said hydrocarbon solution of chlorine is converted to a hydrocarbon solution of bromine, (3) passing the hydrocarbon solution of bromine from step 2 in contact with metallic aluminum to reform hydrocarbon dissolved aluminum bromide, (4) recycling the hydrocarbon solution of aluminum bromide from step 3 to step 1, and (5) recovering aluminum chloride and aluminum bromide impregnated porous solid from step 2 of the process.

2. The process of claim 1 wherein the porous solid is alumina gel.

3. The process of claim 1 wherein the hydrocarbon solvent for the aluminum bromide of step 1 and the hydrocarbon solvent for the chlorine of step 2 is normal butane.

4. The process of claim 1 wherein the porous solid is acid treated bentonite.

ALEX G. OBLAD.
EDWARD R. BOEDEKER.

REFERENCES CITED

The following references are of record in the file of this patent:

UNITED STATES PATENTS

| Number | Name | Date |
|---|---|---|
| 2,351,577 | Thomas | June 13, 1944 |
| 2,342,922 | Danforth | Feb. 29, 1944 |
| 2,286,129 | Veltman | June 9, 1942 |
| 1,692,203 | Egloff | Nov. 20, 1928 |

Certificate of Correction

Patent No. 2,446,100. July 27, 1948.

ALEX G. OBLAD ET AL.

It is hereby certified that errors appear in the printed specification of the above numbered patent requiring correction as follows: Column 2, line 30, for the words "less that" read *less than*; column 3, line 28 for "April 13, 1944" read *April 13, 1948*; column 4, line 57, for "bromide" read *bromine*; column 5, line 51, for "One method" read *Our method*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*

4. The process of claim 1 wherein the porous solid is acid treated bentonite.

ALEX G. OBLAD.
EDWARD R. BOEDEKER.

REFERENCES CITED

The following references are of record in the file of this patent:

UNITED STATES PATENTS

| Number | Name | Date |
|---|---|---|
| 2,351,577 | Thomas | June 13, 1944 |
| 2,342,922 | Danforth | Feb. 29, 1944 |
| 2,286,129 | Veltman | June 9, 1942 |
| 1,692,203 | Egloff | Nov. 20, 1928 |

Certificate of Correction

Patent No. 2,446,100.

July 27, 1948.

ALEX G. OBLAD ET AL.

It is hereby certified that errors appear in the printed specification of the above numbered patent requiring correction as follows: Column 2, line 30, for the words "less that" read *less than*; column 3, line 28 for "April 13, 1944" read *April 13, 1948*; column 4, line 57, for "bromide" read *bromine*; column 5, line 51, for "One method" read *Our method*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*